United States Patent
Moser et al.

(10) Patent No.: US 7,635,455 B2
(45) Date of Patent: Dec. 22, 2009

(54) FLUE GAS PURIFICATION DEVICE HAVING AN IMPROVED OXIDATION DEVICE IN THE SCRUBBING LIQUID SUMP

(75) Inventors: Christian Moser, Essen (DE); Michael Heinke, Dortmund (DE)

(73) Assignee: Lentjes GmbH (DE)

( * ) Notice: Subject to any disclaimer, the term of this patent is extended or adjusted under 35 U.S.C. 154(b) by 507 days.

(21) Appl. No.: 11/287,002

(22) Filed: Nov. 23, 2005

(65) Prior Publication Data

US 2006/0208372 A1  Sep. 21, 2006

(30) Foreign Application Priority Data

Mar. 18, 2005  (EP) .................. 05005920

(51) Int. Cl.
*F01N 3/10* (2006.01)
(52) U.S. Cl. .................. 422/168; 422/177; 210/623
(58) Field of Classification Search ............. 423/210
See application file for complete search history.

(56) References Cited

U.S. PATENT DOCUMENTS

| | | | |
|---|---|---|---|
| 3,800,505 A * | 4/1974 | Tarves, Jr. ............. 95/66 |
| 3,948,608 A | 4/1976 | Weir, Jr. |
| 4,374,813 A | 2/1983 | Chen et al. |
| 4,539,184 A | 9/1985 | Stehning |
| 4,606,867 A | 8/1986 | Eguchi |
| 4,976,751 A | 12/1990 | Schippert |
| 5,199,263 A | 4/1993 | Green et al. |
| 5,540,760 A | 7/1996 | Risse et al. |
| 5,648,048 A | 7/1997 | Kuroda et al. |
| 5,788,944 A | 8/1998 | Kikkawa et al. |
| 5,826,518 A * | 10/1998 | Bhat et al. ............. 110/216 |
| 5,993,640 A | 11/1999 | Risse |
| 2003/0089242 A1 | 5/2003 | Wakamatsu et al. |
| 2003/0116018 A1 | 6/2003 | Echizen et al. |

FOREIGN PATENT DOCUMENTS

| | | |
|---|---|---|
| CA | 1124037 | 5/1982 |
| CA | 1 251 919 | 4/1989 |
| CA | 2111183 | 9/1994 |
| CA | 2137364 | 10/1994 |
| CA | 2135430 | 11/1994 |
| CA | 2 493 769 | 2/2004 |
| CN | 1221647 | 7/1999 |
| DE | 43 29 427 C2 | 9/1993 |
| DE | 44 06 684 A1 | 3/1994 |

(Continued)

OTHER PUBLICATIONS

Communication from European Patent Office regarding related application.

(Continued)

*Primary Examiner*—Melvin C Mayes
*Assistant Examiner*—Kenneth Vaden
(74) *Attorney, Agent, or Firm*—Harness, Dickey & Pierce, P.L.C.

(57) ABSTRACT

A flue gas purification device comprising a receptacle, which has a scrubbing liquid sump comprising an oxidation device for introducing oxygen, wherein the introduction of oxygen is realized by at least one plate aerator.

2 Claims, 4 Drawing Sheets

FOREIGN PATENT DOCUMENTS

| | | |
|---|---|---|
| DE | 195 39 084 A1 | 10/1995 |
| DE | 197 51 851 A1 | 11/1997 |
| DE | 100 58 548 C1 | 11/2000 |
| EP | 0162536 | 2/1985 |
| EP | 0363009 | 9/1989 |
| EP | 0945164 | 10/1997 |
| JP | 58-095216 | 6/1983 |
| JP | 62-194423 | 12/1987 |
| JP | 10-192646 | 7/1998 |
| JP | 2002-035545 | 2/2002 |
| KR | 10-0301564 | 6/2001 |
| KR | 10-2005-0007488 | 1/2005 |
| RU | 2 124 932 C1 | 1/1999 |
| WO | WO 03/082444 A1 | 10/2003 |
| WO | WO 2004/011127 A1 | 2/2004 |

OTHER PUBLICATIONS

Communication from European Patent Office (with non-English abstract) regarding related application.

* cited by examiner

FLUE GAS PURIFICATION DEVICE HAVING AN IMPROVED OXIDATION DEVICE IN THE SCRUBBING LIQUID SUMP

BACKGROUND OF THE INVENTION

1. Technical Field

The present invention relates to a flue gas purification device, in particular for purifying flue gas of a coal power station or the like.

2. Discussion

Purification devices are already known. Normally they comprise a scrubbing column having scrubbing liquid nozzles, which are often arranged on several levels, a scrubbing liquid sump, in which scrubbing liquid is collected, and an absorption zone, which extends inside a cylindric receptacle of the scrubbing column from the scrubbing liquid sump towards the upper scrubbing liquid nozzle level. Flue gas is introduced into a lower section of the absorption zone in the scrubbing column, flows substantially vertically upwards from there and leaves the scrubbing column through an outlet provided above the scrubbing liquid nozzles. On its way through the scrubbing column, the flue gas gets into contact with scrubbing liquid emerging from the scrubbing liquid nozzles and is desulfurized, which is described in the following. Such a purification device is for example known from DE-A-100 58 548.

The scrubbing liquid preferably contains, apart from water, alkaline earths, which react with the sulphur oxides present in the flue gas and the sulphur oxides generated in the scrubbing column. Lime in form of calcium oxide, calcium hydroxide, calcium carbonate or the like is in particular used.

The alkaline earths react with the sulphur oxides present in the flue gas essentially to calcium sulphate, which is bound in the scrubbing liquid. In this manner, the flue gas is purified from the undesirable sulphur oxides and flows out of the purification device afterwards. However, the scrubbing liquid containing the calcium sulphate particles flows into the scrubbing liquid sump and is collected there.

Calcium sulphate has similar positive properties as natural gypsum. It is thus a desired by-product of the flue gas purification process, which is found in the scrubbing liquid collected in the scrubbing liquid sump. The calcium sulphate particles are removed together with the scrubbing liquid from the scrubbing liquid sump and are then extracted from the scrubbing liquid in a subsequent process. The calcium sulphate can then be further processed to materials, in particular construction materials.

A problem in the winning of calcium sulphate is that not only calcium sulphate is generated by the reaction of the scrubbing liquid with the flue gas, but also undesirable by-products, such as for example sulphites, in particular calcium sulphite, which render the calcium sulphate impure and thus worsen the quality of the by-product.

In order to reduce the portion of these undesirable sulphites in the scrubbing liquid present in the scrubbing liquid sump, it is proposed in US-A-4 539 184 to introduce oxygen in form of air or the like into at least one zone of the scrubbing liquid sump, in order to oxidize calcium sulphites, which are present there, to calcium sulphate.

CA-A-2 135 430 also describes a flue gas purification device comprising an oxidation device, which is provided in the scrubbing liquid sump and which has the form of a horizontally arranged grid, which is composed of oxygen supply pipes having corresponding openings, via which the oxygen can be introduced into the scrubbing liquid collected in said scrubbing liquid sump. The horizontal grid is positioned in said scrubbing liquid sump, such that this one is divided into two zones.

SUMMARY OF THE INVENTION

Conventionally used plate aerators generate a high number of very small air bubbles (diameter of <1 mm). Small air bubbles have the advantage that they have a longer residence time in the scrubbing liquid sump than large air bubbles, whereby the introduction of oxygen into the scrubbing liquid is improved. The increase of the number of bubbles enlarges the contact surface between the oxygen bubbles and the scrubbing liquid and thus increases the oxygen exchange by means of diffusion and/or solution at this contact surface. The longer residence time finally increases the way of the bubbles and thus the contact time.

Thus, the oxygen contained in each oxygen bubble leaving the plate aerator can be delivered to the scrubbing liquid in an optimum way. Accordingly, the efficiency of the oxygen introduction and thus the efficiency of the oxidation are optimized.

According to the teachings of this invention, the plate aerator is essentially disk-shaped and, preferably, parallelepiped. In comparison to the disk-shaped form, the parallelepiped geometry has the advantage that the oxygen bubbles, which emerge from the parallelepiped plate aerator tend not to form a bubble column, but rather take a vertical upwards direction without any clear tendency to coalescence. In this way, a high contact surface exchange and a corresponding optimization of the oxidation are achieved.

DETAILED DESCRIPTION

Figure 1:
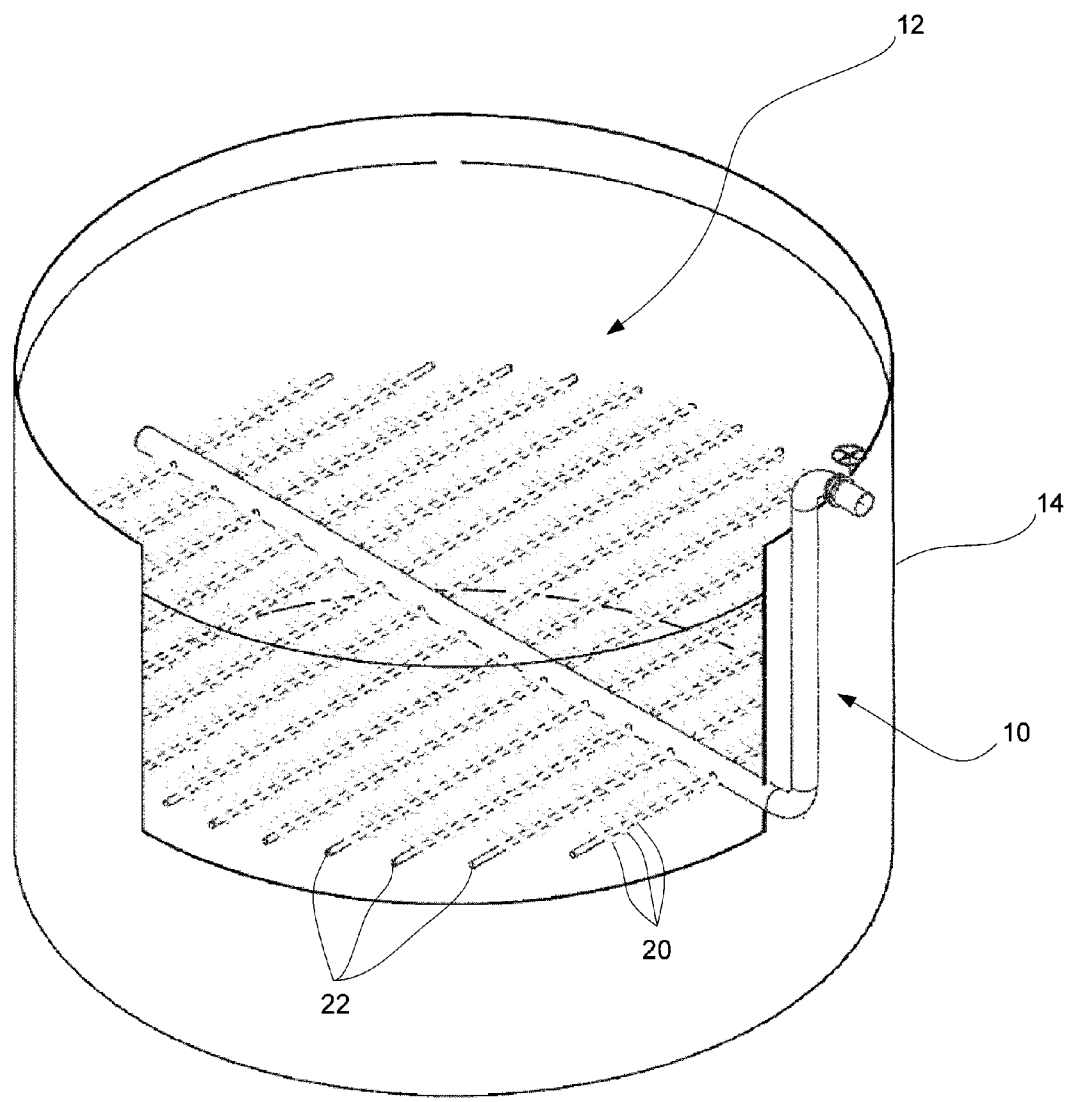
FIG. 1 is a perspective view of a flue gas purification device.
Figure 2:
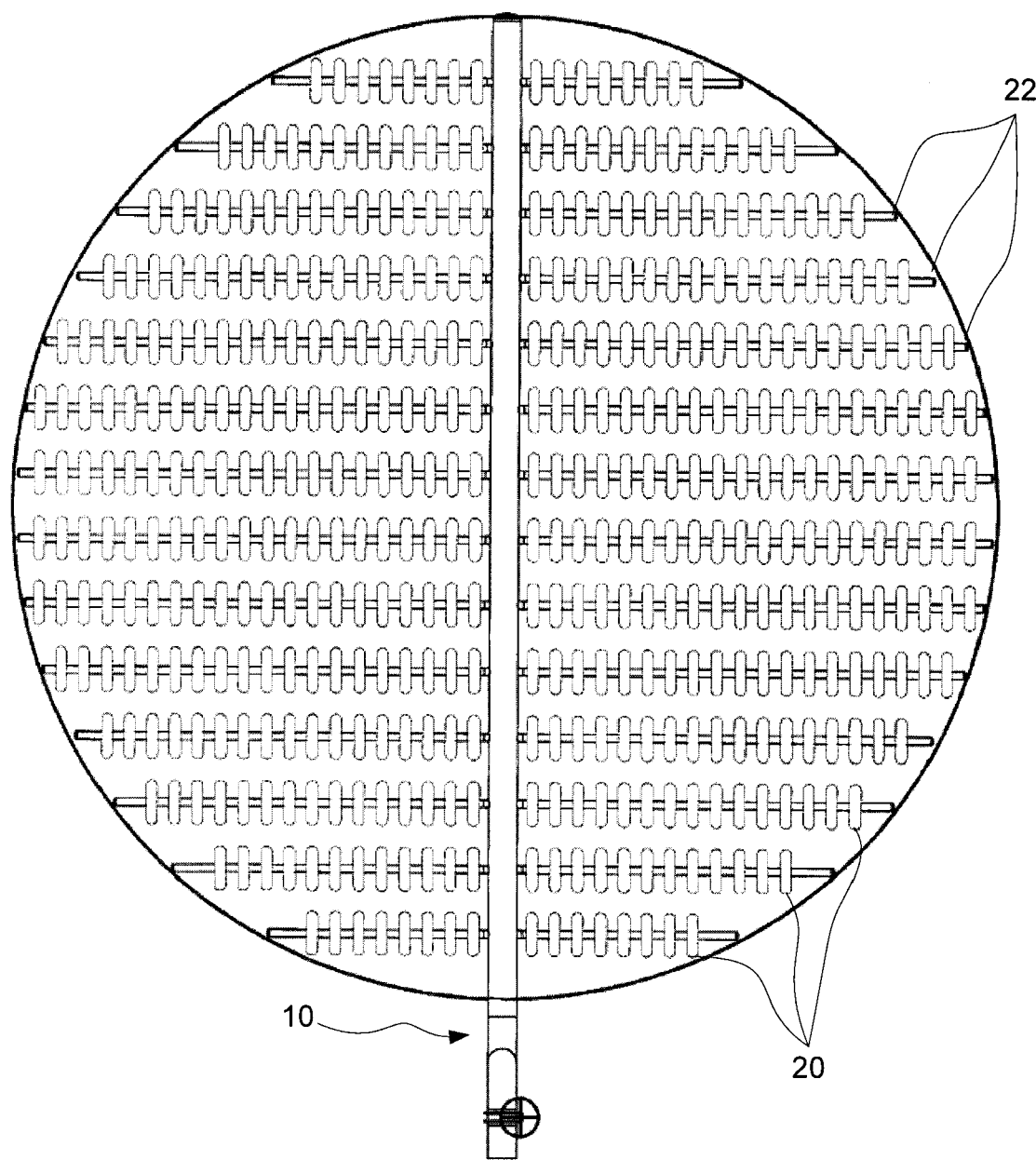
FIG. 2 is a plan view of the flue gas purification device.
Figure 3:
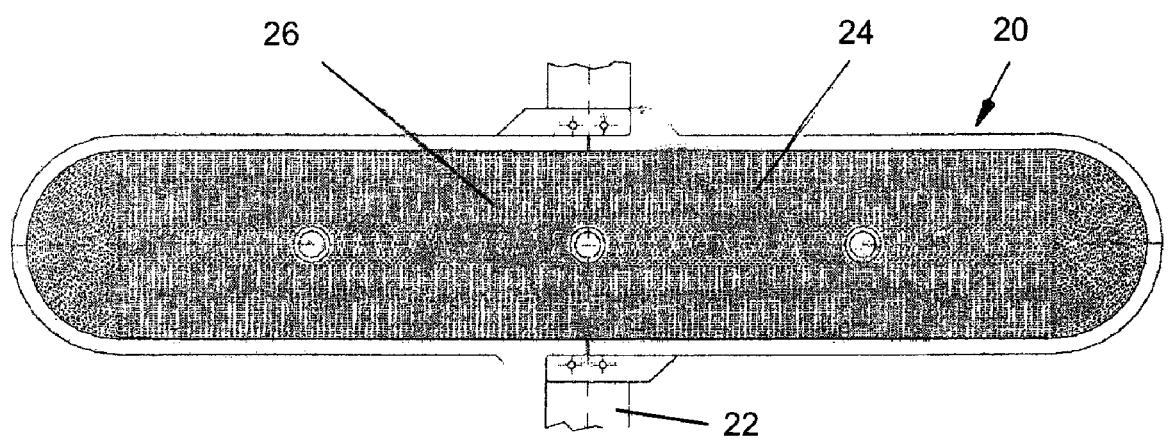
FIG. 3 is a plan view of a plate aerator.

Referring to FIGS. 1-3, according to an embodiment of the present invention, the plate aerator 20 comprises a perforated membrane 24, which is mounted in a replaceable manner in the aerator 20 and through which the oxygen bubbles get out. The perforation preferably comprises slots 26, which can for example be produced by means of a laser. An EPDM membrane has proved especially advantageous.

Figure 4:
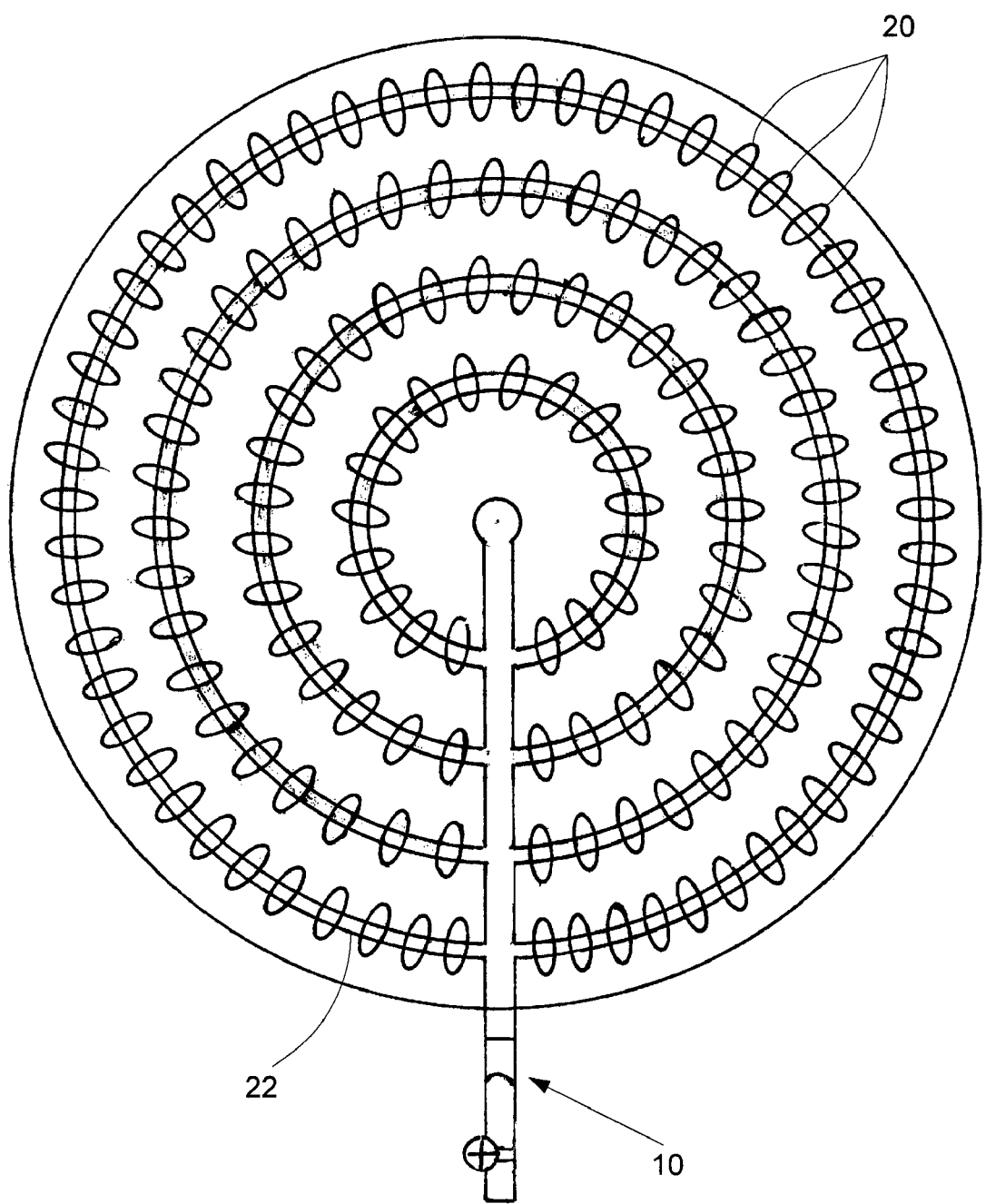
FIG. 4 is a plan view of another flue gas purification device.

Referring to FIG. 4, the oxidation device 10 of the flue gas purification device can comprise one or more plate aerators 20. If several plate aerators 20 are provided, they will preferably be arranged in the scrubbing liquid sump 12 in an annular or radial way. Herein, the plate aerators 20 can be directly fixed at the corresponding oxygen supply pipes 22. The association and final forming of the individual oxygen supply pipes 22 is substantially dependent of the form of the receptacle 14, the oxygen need and the volume of the scrubbing liquid, into which the oxygen shall be introduced. Principally, one can think of any arrangement of the plate aerators 20, of course.

Finally, the present invention relates to a corresponding flue gas purification method, in which the oxygen supply for the oxidation process, which takes place in the scrubbing liquid sump 12, is realized by means of at least one plate aerator 20.

The invention claimed is:

1. A flue gas purification device comprising a receptacle, which has a scrubbing liquid sump comprising an oxidation device for introducing oxygen, wherein a plurality of plate aerators are provided for introducing oxygen, wherein each of the plurality of plate aerators is essentially a parallelepiped and has a perforated membrane and the membrane is mounted in a replaceable manner on that plate aerator, wherein the perforation of each of the membranes comprises slots, wherein each of the membranes is an ethylene propylene diene monomer (EPDM) membrane, wherein the plurality of plate aerators are arranged in the receptacle in an annular or radial way.

2. The flue gas purification device of claim 1, wherein the plurality of plate aerators each generate air bubbles having diameters less than 1 mm.

* * * * *

UNITED STATES PATENT AND TRADEMARK OFFICE
CERTIFICATE OF CORRECTION

PATENT NO. : 7,635,455 B2
APPLICATION NO. : 11/287002
DATED : December 22, 2009
INVENTOR(S) : Moser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Ninth Day of November, 2010

David J. Kappos
*Director of the United States Patent and Trademark Office*